(No Model.)

D. BLACK.
VELOCIPEDE.

No. 432,814. Patented July 22, 1890.

Witnesses
N. S. Amstutz
H. S. McPaul

David Black Inventor

By his Attorney H. T. Fisher

UNITED STATES PATENT OFFICE.

DAVID BLACK, OF LORAIN, OHIO.

VELOCIPEDE.

SPECIFICATION forming part of Letters Patent No. 432,814, dated July 22, 1890.

Application filed February 12, 1890. Serial No. 340,119. (No model.)

*To all whom it may concern:*

Be it known that I, DAVID BLACK, a citizen of the United States, residing at the village of Lorain, in the county of Lorain and State of Ohio, have invented certain new and useful Improvements in Bicycle-Pedals; and I do hereby declare that the following is a full, clear, and exact description of the invention, which will enable others skilled in the art to which it appertains to make and use the same.

My invention relates to improvements in bicycles, tricycles, and other light vehicles; and the invention consists in the construction, combination, and arrangement of parts, substantially as shown and described, and particularly pointed out in the claims.

Figure 1:
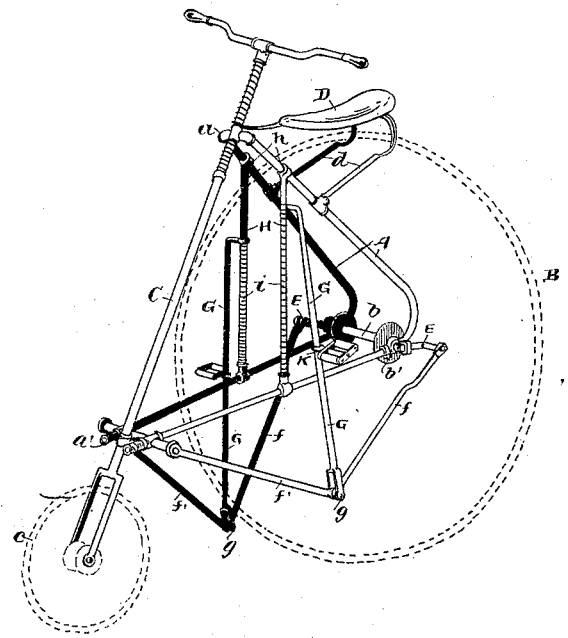
Figure 3:
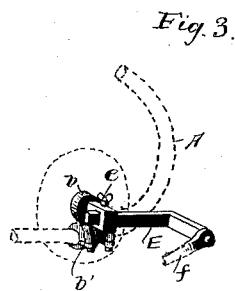
Figure 2:
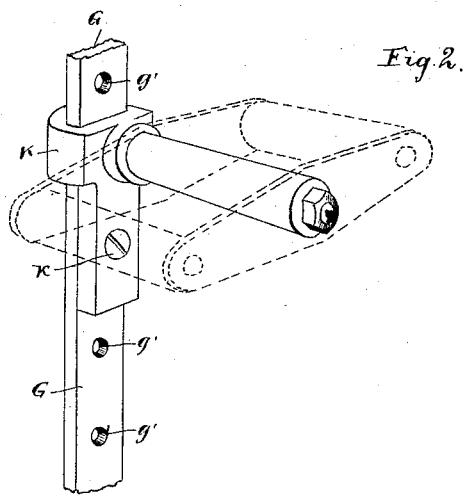

In the accompanying drawings, Figure 1 is a perspective view of a bicycle which embodies my improvements. Fig. 2 is a detail of one of the pedals, showing a method of attaching it to the pedal-rod. Fig. 3 is a detail enlarged of one of the cranks, showing its attachment to the spindle.

The frame A of the machine, as is seen in Fig. 1, is substantially triangular in outline, and in this instance consists of two tubes or pipe-sections of the lightest grades, each bent, as shown, and having their ends firmly united by yokes $a$ and $a'$, so as to make the frame rigid. The spindle $b$ of the wheel B rests in suitable bearings formed in clips $b'$ and attached to the frame A just in front of the bent portion or angle of the frame and on the lower portion thereof. From the spindle $b$ the top part of the frame curves around at the sides of the wheel toward the front and stands at an angle of about forty-five degrees to a vertical plane, while the lower portion of the frame projects forward at either side of the wheel, and the yokes, as before stated, connect the sides rigidly together. The steering-rod C has bearings in these yokes and carries the steering-wheel $c$ in a well-known way. The seat D is supported on spring-arms $d$, secured to the upper portion of the frame some distance in front of the vertical axis of the wheel, so as to bring the rider into suitable position on the wheel and where he can more conveniently and advantageously operate the pedal mechanism. This mechanism is of an entirely novel design, so far as I am aware.

In the first place, I secure separate cranks E to each end of the wheel-spindle, and these cranks are held adjustably by suitable fastenings $e$ so that they may be extended or shortened, according to the conditions of the road and the work to be done. Where the roads are heavy and considerable power is required to drive the wheel, the cranks would be extended, so as to obtain all the leverage possible; but where the roads or grades are easy the crank-arms would be moved inward, so as to bring the cranks nearer the spindle, which of course would shorten the stroke and enable the rotation to be made more frequently. Connected with these cranks at either side are rods $f$, and jointed to these rods or links at their outer extremity are rods or links $f'$, which at their forward ends are bent at right angles and pivoted and free to turn in the sides of the yoke $a'$. The two rods $f f'$ together constitute a toggle-connecting rod, and at the union of these rods or links I connect the pedal-rod G by means of a pivot-bolt $g$, which extends through the ends of the links and the bifurcated end of the said pivot-rod. The two rods or links $f$ and $f'$ are substantially the same length, and the pedal-rods G are arranged in a substantially vertical position, with their upper ends bent inward at right angles and provided with suitable bearings to slide up and down on the guide-rods H. These rods are two in number—one on either side of the wheel—and connected rigidly at their ends with the sides of the frame, suitable thimbles $h$ or their equivalent being used for this purpose. The guide-rods H have spiral springs $i$ of suitable tension arranged thereon between their lower ends and the bearings of the pedal-rods and are designed to counterbalance one another when the machine is in operation and to assist in carrying the pedals and rods upward after a downstroke has been made. Of course the cranks E are arranged directly opposite one another, so that when one pedal has completed its downstroke the other will be ready to go down, the operation in this respect being substantially like the common arrangement of pedals on the wheel-spindle. It will be observed that the guide-rods H are arranged in the most natural position possible with respect to the rider, so that as the pedal-rods move up and down there will be no strength of consequence wasted in friction on the guide-rods and no strain that will detract from the force of the down thrust. By this arrangement of pedal, guide-rod, and connecting-rods it will be seen that the movements of the pedal will be practically in vertical lines, notwithstanding the sweep of the crank E, and by reason of the links passing down, as shown at the right of Fig. 1, when the crank is farthest forward, there is room given for the crank to turn without any back and forth sliding motion in the connecting-rods. This I esteem a very great advantage in the operating mechanism peculiar to this invention. There is no movement of the limbs in a circle to follow the movement of the pedals, as formerly, but a practically-direct movement, which enables the rider to give impetus to the machine by a powerful down thrust, which is straight and direct instead of being on a circle, where the thrust will soon exhaust itself by the fact of its rotary movement. Another advantage is that I avoid all dead centers in the movement, and this makes the operation of the machine easy and natural without loss of power.

To adapt the pedals to any size of rider, the pedals are made adjustable, as clearly seen in Fig. 2, in which the pedal-rod is provided with a series of holes $g$ and the pedal rests on a sliding support K, which is provided with a screw $k$, adapted to be set into one of the holes $g$. Of course any suitable means of securing and adjusting a pedal on the rod G may be adopted, and the same is true of the manner of securing the cranks E on the wheel-spindle.

In case the supporting-frame and the pedal mechanism is to be used with differently-constructed machines—such as bicycles having two large wheels, one behind the other, and known as "Safety" machines, and in the construction of vehicles for boys or children— the frame $a$ would be so far modified in its shape as to suit the peculiar conditions to which it would be subjected. However, the main features of construction would remain as here shown, and the operation would be the same in effect.

Having thus described my invention, what I claim as new, and desire to secure by Letters Patent, is—

1. In a bicycle or like vehicle, a supporting-frame consisting of two separate rods bent to substantially a triangular shape and rigidly connected at their respective ends, a wheel and spindle in the angle of the rods, yokes connecting the ends of the said rods, a steering-rod supported on the yokes and extending above the upper yoke, and a seat on the rear inclined portion of the frame, substantially as described.

2. In a bicycle or like vehicle, a triangular supporting-frame and a wheel having cranks on its spindle outside of said frame, toggle-rods connected with the outside of the frame at its front and with the said spindles, and pedal-rods to operate the toggle-rods, substantially as described.

3. In a bicycle or like vehicle, a pair of toggle-rods supported on the main frame and separate cranks on the wheel spindle or axle, guides for the pedal-rods, and said rods, all in combination, substantially as described.

4. In a bicycle or like vehicle, a pair of pedal-rods connected pivotally at one end with the supporting-frame and at the other with the wheel axle or spindle, pedal-rods attached at the joints of said rods, and guides on which the pedal-rods have bearings, substantially as described.

5. In a bicycle or like vehicle, a supporting-frame and a pair of guide-rods for the pedal-rods on said frame, toggle-rods connected with the frame and the driving axle or spindle, and pedal-rods attached at one end about centrally to the toggle-rods and provided with bearings to slide on the said guide-rods, substantially as described.

6. In a bicycle or like vehicle, a pair of toggle-rods connected at one end with the driving axle or spindle and pivoted at the other end to the yoke on the frame, rods provided with pedals connected with said toggle-rods, guides for said pedal-rods, and springs on said guides beneath the ends of the pedal-rods, substantially as described.

7. In a bicycle or like vehicle, a pair of guide-rods on the main frame having compressible springs, pedal-rods bearing on said springs, and a pair of toggle-rods to which the pedal-rods are jointed, substantially as described.

8. In a bicycle or like vehicle, a tubular main frame consisting of two parts bent substantially into triangular form and connected with the wheel-axle near the angle of the frame, yokes connecting the sides of said frame at the respective ends, the steer-wheel rod supported in said yokes, toggle-rods to drive the vehicle, and pedals by which said toggle-rods are operated, substantially as set forth.

Witness my hand to the foregoing specification this 9th day of November, 1889.

DAVID BLACK.

Witnesses:
W. B. THOMPSON,
E. E. BROWN.